United States Patent
Shiohara et al.

(10) Patent No.: US 7,997,350 B2
(45) Date of Patent: Aug. 16, 2011

(54) MOTOR GRADER AND CLUTCH-CONTROL METHOD FOR MOTOR GRADER

(75) Inventors: Masaki Shiohara, Komatsu (JP); Michihiro Aida, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/522,270

(22) PCT Filed: Jan. 31, 2008

(86) PCT No.: PCT/JP2008/051494
§ 371 (c)(1),
(2), (4) Date: Jul. 7, 2009

(87) PCT Pub. No.: WO2008/120489
PCT Pub. Date: Oct. 9, 2008

(65) Prior Publication Data
US 2010/0044060 A1    Feb. 25, 2010

(30) Foreign Application Priority Data
Mar. 29, 2007   (JP) .................................. 2007-087547

(51) Int. Cl.
*A01B 41/06*    (2006.01)
(52) U.S. Cl. ............................................. 172/2; 477/97
(58) Field of Classification Search .................. 172/2, 3, 172/4.5, 10; 477/97
See application file for complete search history.

(56) References Cited

U.S. PATENT DOCUMENTS

| 4,582,141 | A | * | 4/1986 | van der Lely | 172/3 |
| 5,462,122 | A | * | 10/1995 | Yamamoto et al. | 172/2 |
| 5,474,147 | A | * | 12/1995 | Yesel et al. | 180/197 |
| 5,528,843 | A | * | 6/1996 | Rocke | 37/348 |
| 6,086,509 | A | * | 7/2000 | Johnson et al. | 477/97 |
| 6,854,523 | B2 | | 2/2005 | Takahashi | |
| 7,774,117 | B2 | * | 8/2010 | Ozawa et al. | 701/54 |
| 2006/0191692 | A1 | * | 8/2006 | Holt et al. | 172/2 |

FOREIGN PATENT DOCUMENTS

| JP | 2002-295664 A | 10/2002 |
| JP | 2003-343325 A | 12/2003 |
| JP | 2006-348742 A | 12/2006 |

* cited by examiner

*Primary Examiner* — Robert Pezzuto
*Assistant Examiner* — Jamie L McGowan
(74) *Attorney, Agent, or Firm* — Global IP Counselors (57) ABSTRACT

In a motor grader, when a cylinder hydraulic pressure detected by a cylinder-hydraulic-pressure-detecting section is less than a predetermined threshold value, a control section makes a determination that the motor grader is in a running state and uses a running-hydraulic-pressure waveform corresponding to the running state to control the hydraulic pressure supplied to a clutch. When the cylinder hydraulic pressure is greater than or equal to the threshold value, the control section makes a determination that the motor grader is in a working state and uses a working-hydraulic-pressure waveform corresponding to the working state to control the hydraulic pressure supplied to the clutch.

5 Claims, 6 Drawing Sheets

MOTOR GRADER AND CLUTCH-CONTROL METHOD FOR MOTOR GRADER

CROSS-REFERENCE TO RELATED APPLICATIONS

This national phase application claims priority to Japanese Patent Application No. 2007-087547, filed on Mar. 29, 2007. The entire disclosure of Japanese Patent Application No. 2007-087547 is hereby incorporated herein by reference.

TECHNICAL FIELD

The present invention relates to a motor grader and a clutch-control method for the motor grader.

BACKGROUND ART

Motor graders are conventionally well-known as a type of construction vehicle for preparing smooth road or ground surfaces. The motor grader is provided with an engine, undercarriage wheels that are rotatably driven by driving force from the engine, and a driving force-transmitting mechanism for transmitting the driving force from the engine to the wheels. Gears can be changed by changing the hydraulic clutch provided to the driving force-transmitting mechanism. The motor grader has a blade that is driven by a hydraulic cylinder. The motor grader moves in a state in which the blade contacts the road surface, whereby a variety of operations such as those given above can be performed (see Japanese Laid-Open Patent Application No. 2003-343325).

In dump trucks, however, a hydraulic-pressure waveform for controlling the clutch is generally modified according to changes in running resistance (see Japanese Laid-Open Patent Application No. 2002-295664). The ratio of speed of the torque converter in the dump truck is used to determine a large, intermediate, or small level of running resistance, and the clutch is controlled using a waveform corresponding to each of the levels. Clutch control can thereby be performed according to the driving conditions, e.g., running on highly uneven construction sites, soft ground, or the like, and shock can be suppressed by changing the clutch.

SUMMARY OF THE INVENTION

When performing ground-leveling operations using a blade, the motor grader described above moves in a state in which the blade contacts the ground. General road travel may also be performed in a state in which the blade is raised so as to avoid contact with the ground. However, the afore-described dump-truck-type clutch control does not allow differentiation between the state in which the vehicle performs ground-leveling operations using the blade and the state in which travel occurs without using the blade. Suppressing shock upon switching the clutch is therefore difficult when performing clutch control in a motor grader as described above.

It is one object of the present invention to provide a motor grader that allows shocks to be suppressed upon switching the clutch.

A motor grader according to a first aspect of the present invention includes an engine, a wheel, a driving force-transmitting mechanism, a working equipment cylinder, a blade, a cylinder-hydraulic-pressure-detecting section, and a control section. The wheel is configured and arranged to be rotatably driven by a driving force from the engine. The driving force-transmitting mechanism is configured and arranged to transmit the driving force from the engine to the wheel and has a clutch that is configured and arranged to e driven by hydraulic pressure. The working equipment cylinder is a hydraulic cylinder configured and arranged to be driven by hydraulic pressure. The blade is configured and arranged to be driven by the working equipment cylinder. The cylinder-hydraulic-pressure-detecting section is configured and arranged to detect the hydraulic pressure supplied to the working equipment cylinder. The control section is configured to determine that the motor grader is in a running state when the cylinder hydraulic pressure detected by the cylinder-hydraulic-pressure-detecting section is less than a predetermined threshold value and to use a running-hydraulic-pressure waveform corresponding to the running state to control the hydraulic pressure supplied to the clutch. The control section is configured to determine that the motor grader is in a working state when the cylinder hydraulic pressure is greater than or equal to the threshold value and to use a working-hydraulic-pressure waveform corresponding to the working state to control the hydraulic pressure supplied to the clutch.

In this motor grader, a judgment is made as to whether or not the hydraulic pressure of the working equipment cylinder that drives the blade is less than a predetermined threshold value. The load on the working equipment cylinder is small when the vehicle is in a running state, and therefore the cylinder hydraulic pressure decreases. The load on the working equipment cylinder is large when the vehicle is in a working state, and therefore the cylinder hydraulic pressure increases. Therefore, by comparing the hydraulic pressure of the working equipment cylinder to a predetermined threshold value, a judgment can be accurately made as to whether the vehicle is in the running state or the working state. A running-hydraulic-pressure waveform corresponding to the running state is used to control the hydraulic pressure supplied to the clutch when a judgment is made that the vehicle is in the running state. A working-hydraulic-pressure waveform corresponding to the working state is used to control the hydraulic pressure supplied to the clutch when a judgment is made that the vehicle is in the working state. As a result, appropriate clutch control can be performed in this motor grader during running and working, and shock can be suppressed when switching the clutch.

Depending on the magnitude of the threshold value, cases in which the state is judged to be the running state also include cases of running while the blade is in contact with the ground and subjected to a relatively light load.

A motor grader according to a second aspect of the present invention is the motor grader according to the first aspect, wherein the working equipment cylinder is a lift cylinder configured and arranged to move the blade in a vertical direction.

In this motor grader, the cylinder hydraulic pressure of a lift cylinder for causing the blade to move in the vertical direction is compared with the predetermined threshold value. The lift cylinder maintains the blade in a state pressed to the ground in the working state and maintains the blade in a raised state in the running state. The cylinder hydraulic pressure of the lift cylinder is therefore different between the running state and the working state. The cylinder hydraulic pressure also changes between performing operations under a large load and performing operations under a small load. The control section can therefore use the cylinder hydraulic pressure of the lift cylinder to accurately judge the state of the vehicle.

A motor grader according to a third aspect of the present invention is the motor grader according to the first aspect, wherein the working equipment cylinder is a tilt cylinder configured and arranged to change an angle of the blade.

In this motor grader, the cylinder hydraulic pressure of a tilt cylinder for changing the angle of the blade is compared with the threshold value. The load on the blade from the ground changes depending on the angle of the blade. The cylinder hydraulic pressure of the tilt cylinder changes when the angle of the blade changes. The control section can therefore accurately judge the state of the vehicle using the cylinder hydraulic pressure of the tilt cylinder.

A clutch-control method for a motor grader of a fourth aspect of the present invention is a method for controlling a hydraulic clutch provided to a motor grader. The method includes a step for detecting cylinder hydraulic pressure, a determination step, a running-state clutch control step, and a working-state clutch control step. In the step for detecting cylinder hydraulic pressure, a hydraulic pressure supplied to a working equipment cylinder for driving a blade is detected. In the determination step, a determination is made as to whether or not the cylinder hydraulic pressure detected in the step for detecting cylinder hydraulic pressure is less than a predetermined threshold value. In the running-state clutch control step, a determination is made that the motor grader is in a running state when the cylinder hydraulic pressure is less than the threshold value, and a running-hydraulic-pressure waveform corresponding to the running state is used to control the hydraulic pressure supplied to the clutch. In the working-state clutch control step, a determination is made that the motor grader is in a working state when the cylinder hydraulic pressure is greater than or equal to the predetermined threshold value, and a working-hydraulic-pressure waveform corresponding to the working state is used to control the hydraulic pressure supplied to the clutch.

In this clutch-control method for a motor grader, a determination is made as to whether or not the hydraulic pressure of the working equipment cylinder that drives the blade is less than a predetermined threshold value. The load on the working equipment cylinder is small when the vehicle is in a running state, and therefore the cylinder hydraulic pressure decreases. The load on the working equipment cylinder is large when the vehicle is in a working state, and therefore the cylinder hydraulic pressure increases. Therefore, by comparing the hydraulic pressure of the working equipment cylinder to a predetermined threshold value, a determination can be accurately made as to whether the vehicle is in the running state or the working state. A running-hydraulic-pressure waveform corresponding to the running state is used to control the hydraulic pressure supplied to the clutch when a determination is made that the vehicle is in the running state. A working-hydraulic-pressure waveform corresponding to the working state is used to control the hydraulic pressure supplied to the clutch when a determination is made that the vehicle is in the working state. As a result, appropriate clutch control can be performed in this motor grader during running and working, and shock can be suppressed when switching the clutch.

DETAILED DESCRIPTION OF THE PREFERRED EMBODIMENTS

Configuration

Overall Configuration

Figure 1:
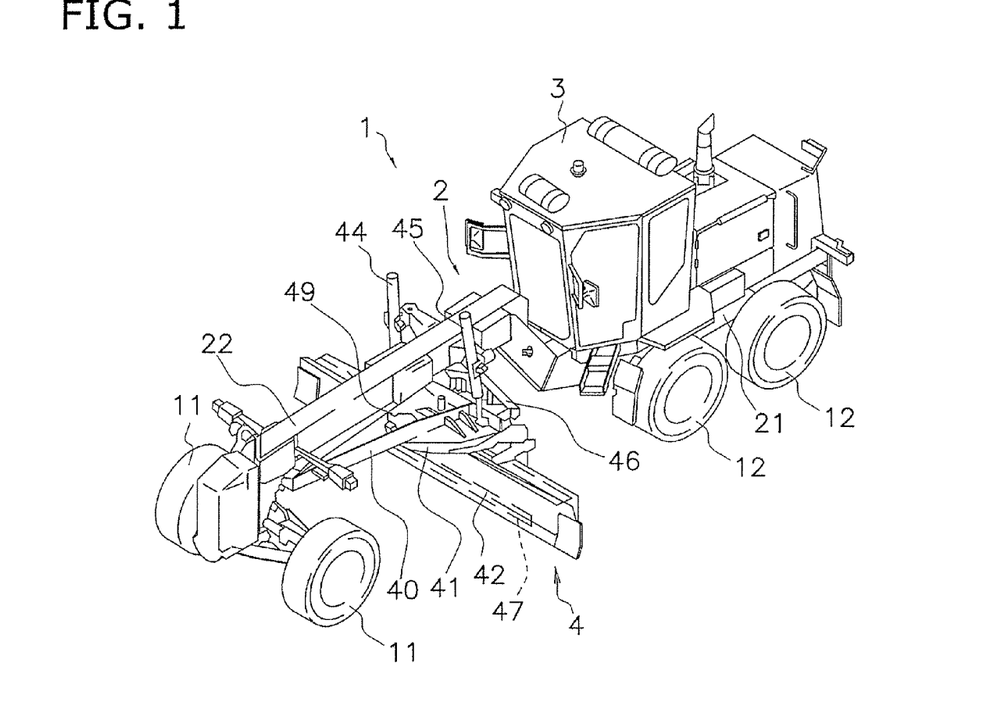
FIG. 1 is an external perspective view of the motor grader.
Figure 2:
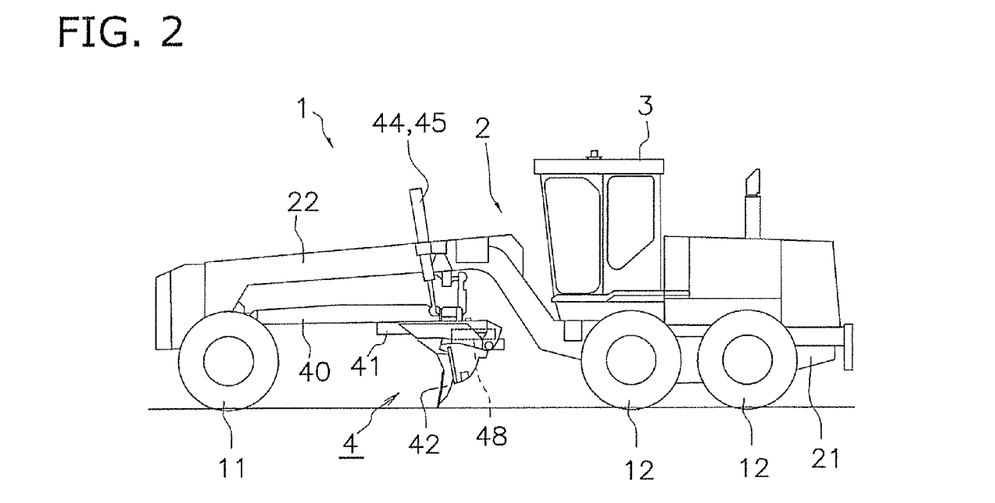
FIG. 2 is a lateral view of the motor grader.

An external perspective view and a lateral view of a motor grader 1 according to an embodiment of the present invention are shown in FIGS. 1 and 2. The motor grader 1 is provided with six wheels composed of a pair of left and right front wheels 11 and rear wheels 12 (two on each side). A blade 42 provided between the front wheels 11 and the rear wheels 12 can be used for ground leveling, snow removal, light cutting, mixing materials, and other operations. Of the four rear wheels 12, only the wheels positioned on the left side are shown in FIGS. 1 and 2.

The motor grader 1 is provided with a frame 2, a cabin 3, and a working equipment 4, as shown in FIGS. 1 and 2. The motor grader 1 is also provided with an engine 5, a driving force-transmitting mechanism 6, a hydraulic drive mechanism 7, a control section 8, and the like, as shown in FIG. 3.

Frame 2 and Cabin 3

The frame 2 comprises a rearward frame 21 and a forward frame 22, as shown in FIGS. 1 and 2.

Figure 3:
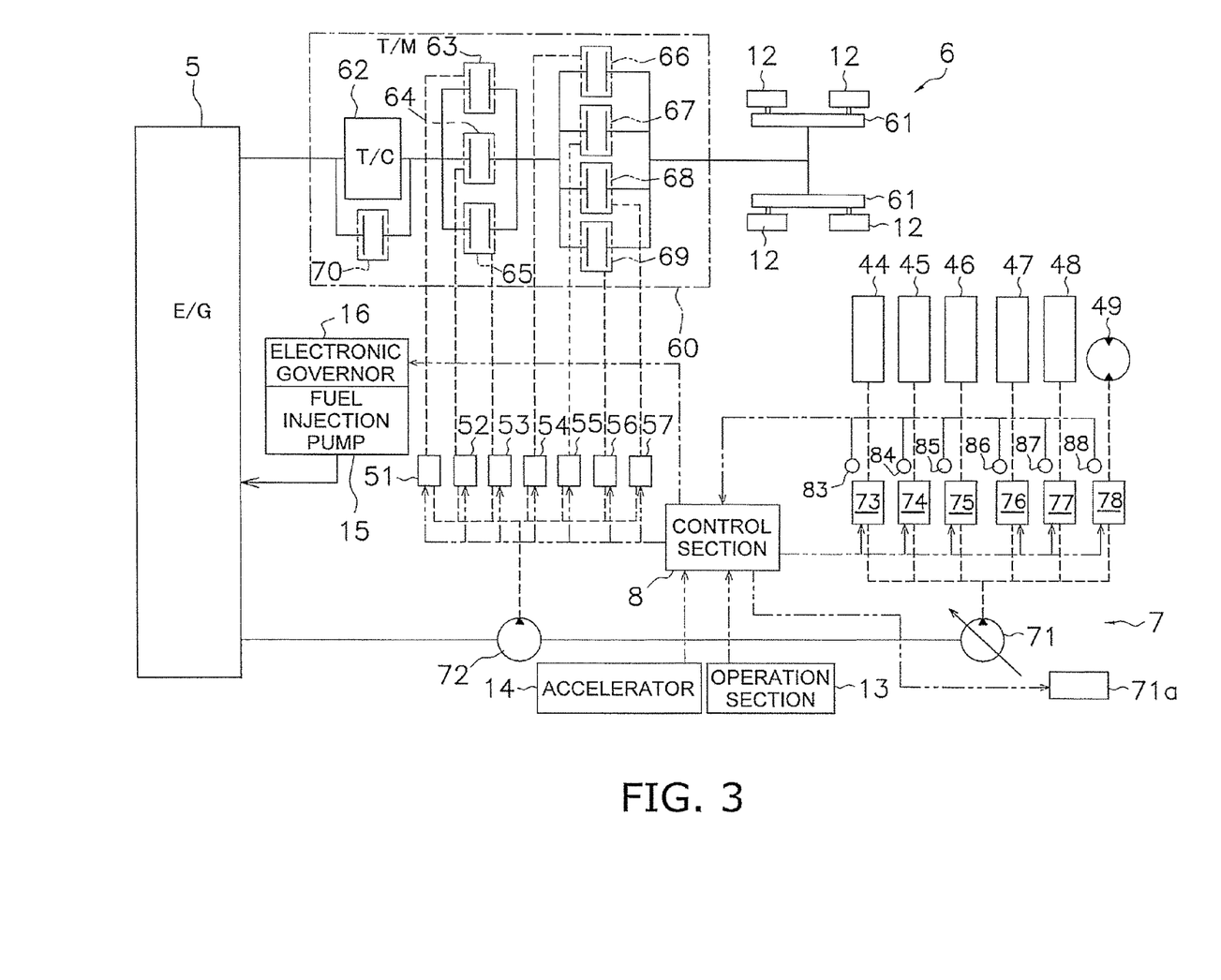
FIG. 3 is a schematic diagram of the configuration of the driving force-transmitting mechanism, the hydraulic driving mechanism, and the control section.

The rearward frame 21 houses the engine 5, the driving force-transmitting mechanism 6, the hydraulic drive mechanism 7, and the like shown in FIG. 3. The four rear wheels 12 are provided to the rearward frame 21. The rear wheels 12 are rotationally driven by the driving force from the engine 5, whereby the vehicle can travel.

The forward frame 22 is attached to the front of the rearward frame 21. The front wheels 11 are attached to the front end of the forward frame 22.

The cabin 3 is mounted on the rearward frame 21. Handles, a gear-change lever, levers for operating the working equipment 4, other components of an operation section 13 (see FIG. 3), in accelerator 14, a brake, an inching pedal (not shown), and the like are provided to the interior of the cabin. The cabin 3 may also be mounted on the forward frame 22.

Working Equipment 4

The working equipment 4 has, e.g., a drawbar 40, a circle 41, the blade 42, a hydraulic motor 49, hydraulic cylinders 44 through 48, and the like.

The front end of the drawbar 40 is swivelably attached to the front end of the forward frame 22. The rear end of the drawbar 40 rises and falls due to synchronous expansion and contraction of the pair of lift cylinders 44, 45. The drawbar 40 is tilted in the vertical direction due to differential expansion and contraction of the lift cylinders 44, 45. The drawbar 40 also swivels up and down about the axis along the direction of travel of the vehicle due to expansion and contraction of the drawbar shift cylinder 46.

The circle 41 is rotatably attached to the rear end of the drawbar 40. The circle 41 is driven by the hydraulic motor 49 (see FIG. 1) and rotates in a clockwise or counter-clockwise direction relative to the drawbar 40 as viewed from above the vehicle.

The blade 42 is supported so as to be able to slide in the horizontal direction relative to the circle 41 and so as to be able to swivel up and down about an axis parallel to the horizontal direction. By "horizontal direction" is meant the lateral direction relative to the direction of travel of the vehicle. The blade shift cylinder 47, which is supported by the circle 41, allows the blade 42 to move in the horizontal direction relative to the circle 41. The tilt cylinder 48 (see FIG. 2) supported by the circle 41 allows the blade 42 to swivel about the axis parallel to the horizontal direction and change the vertical orientation relative to the circle 41. The blade 42 as described above can, via the drawbar 40 and the circle 41, rise or fall vertically with respect to the vehicle, change in tilt orientation relative to the direction of travel, change in tilt orientation relative to the horizontal direction, rotate, and shift in the lateral direction.

The hydraulic motor 49 is driven by hydraulic fluid supplied from a first hydraulic pump 71 (described hereinafter), whereby the circle 41 is made to rotate.

The various hydraulic cylinders 44 through 48 are driven by hydraulic pressure provided from the first hydraulic pump 71. These cylinders include, e.g., the pair of lift cylinders 44, 45, the drawbar shift cylinder 46, the blade shift cylinder 47, the tilt cylinder 48, and the like as described above. The pair of lift cylinders 44, 45 are provided separated on the left and right sides sandwiching the forward frame 22 between them. The lift cylinders 44, 45 are positioned substantially along the vertical direction and are attached to the forward frame 22 and the drawbar 40. The expansion and contraction of the lift cylinders 44, 45 causes the rear end of the drawbar 40 to rise and fall, whereby the blade 42 can be made to move in the vertical direction. The drawbar shift cylinder 46 is positioned slantwise relative to the vertical direction and is attached to the lateral end of the forward frame 22 and the drawbar 40. The expansion and contraction of the drawbar shift cylinder 46 allows the slant angle of the drawbar 40 relative to the horizontal direction to be changed, whereby the slant angle of the blade 42 can be changed. The blade shift cylinder 47 is positioned along the longitudinal direction of the blade 42 and is attached to the circle 41 and the blade 42. The expansion and contraction of the blade shift cylinder 47 allows the longitudinal position of the blade 42 to be changed. The tilt cylinder 48 is attached to the circle 41 and the blade 42. The expansion and contraction of the tilt cylinder 48 allows the blade 42 to swivel up and down about the axis along the horizontal direction, whereby the tilt angle of the blade 42 relative to the direction of travel can be changed.

Engine 5

As shown in FIG. 3, a fuel injection pump 15 is affixed to the engine 5. Fuel is provided to the engine 5 from the fuel injection pump 15. The amount of fuel is controlled by an injection-volume signal output from the control section 8 (described hereinafter) to an electronic governor 16. The control section 8 controls the amount of fuel supplied to the engine 5, whereby the rotational speed of the engine 5 can be controlled.

Driving Force-Transmitting Mechanism 6

The driving force-transmitting mechanism 6 is designed to transmit driving force from the engine 5 to the rear wheels 12. The driving force-transmitting mechanism 6 has a transmission 60 and a tandem device 61.

The transmission 60 has, e.g., a torque convertor 62, various clutches 63 through 69, and a plurality of gears used to change speed (not shown).

The torque convertor 62 is connected to the output side of the engine 5. A lock-up clutch 70 for joining the input shaft and the output shaft of the torque convertor 62 is provided to the torque convertor 62. A switch included in the aforedescribed operation section 13 is operated, whereby the lock-up clutch 70 switches between an engaged state and a disengaged state. Driving force is transmitted from the engine 5 without passing through the torque convertor 62 when the lock-up clutch 70 is in an engaged state. Driving force from the engine 5 is transmitted via the torque convertor 62 when the lock-up clutch 70 is in a disengaged state.

The various clutches 63 through 69 are hydraulic clutches that are driven by hydraulic pressure supplied from a second hydraulic pump 72 (described hereinafter). These clutches include the FL clutch 63, the FH clutch 64, the R clutch 65, the first clutch 66, the second clutch 67, the third clutch 68, and the fourth clutch 69. The FL clutch 63 and the FH clutch 64 are engaged during forward travel of the vehicle. The R clutch 65 is engaged during backward travel of the vehicle. The first clutch 66, the second clutch 67, the third clutch 68, and the fourth clutch 69 are engaged during transmission of driving force to the corresponding transmission gears. During forward travel, speed levels one through eight can be selected in the transmission 60 using a combination of either the FL clutch 63 or the FH clutch 64 and one of the first clutch 66 through the fourth clutch 69. During backward travel, speed levels one through four can be selected using a combination of the R clutch 65 and one of the first clutch 66 through the fourth clutch 69.

The driving force output from the transmission 60 is transmitted to the rear wheels 12 via a final reduction gear (not shown) and the tandem device 61.

Hydraulic Drive Mechanism 7

The hydraulic drive mechanism 7 is a mechanism for producing hydraulic pressure using the driving force from the engine 5 and driving the various clutches 63 through 69, the hydraulic motor 49, and the various cylinders 44 through 48 described above. The hydraulic drive mechanism 7 comprises the first hydraulic pump 71, the second hydraulic pump 72, various hydraulic-pressure control valves 73 through 78, 51 through 57, and various sensors 83 through 88.

The first hydraulic pump 71 is driven by driving force from the engine 5 and produces hydraulic pressure supplied to the various cylinders 44 through 48 and the hydraulic motor 49. The first hydraulic pump 71 is a variable-displacement hydraulic pump that uses a pump-volume control cylinder 71a to change the tilt angle of a swashplate, thereby changing the volume of hydraulic fluid discharged.

The second hydraulic pump 72 is driven by driving force from the engine 5 and produces hydraulic pressure supplied to the various clutches 63 through 69.

The various hydraulic-pressure control valves 73 through 78, 51 through 57 are electromagnetic proportional control valves that are electrically controlled by the control section 8, whereby hydraulic pressure can be regulated. These valves include, e.g., the first through fifth cylinder control valves 73 through 77, the hydraulic-motor control valve 78, and the first through seventh clutch control valves 51 through 57.

The first through fifth cylinder control valves 73 through 77 regulate the hydraulic pressure supplied to the various cylinders 44 through 48 described above. Specifically, the first cylinder control valve 73 regulates the hydraulic pressure supplied to the lift cylinder 44. The second cylinder control valve 74 regulates the hydraulic pressure supplied to the lift cylinder 45. The third cylinder control valve 75 regulates the hydraulic pressure supplied to the drawbar shift cylinder 46. The fourth cylinder control valve 76 regulates the hydraulic pressure supplied to the blade shift cylinder 47. The fifth cylinder control valve 77 regulates the hydraulic pressure supplied to the tilt cylinder 48.

The hydraulic-motor control valve 78 regulates the hydraulic pressure supplied to the hydraulic motor 49 described above.

The first through seventh clutch control valves 51 through 57 regulate the hydraulic pressure supplied to the various clutches 63 through 69 described above. Specifically, the first clutch control valve 51 regulates the hydraulic pressure supplied to the FL clutch 63. The second clutch control valve 52 regulates the hydraulic pressure supplied to the FH clutch 64. The third clutch control valve 53 regulates the hydraulic pressure supplied to the R clutch 65. The fourth clutch control valve 54 regulates the hydraulic pressure supplied to the first clutch 66. The fifth clutch control valve 55 regulates the hydraulic pressure supplied to the second clutch 67. The sixth clutch control valve 56 regulates the hydraulic pressure supplied to the third clutch 68. The seventh clutch control valve 57 regulates the hydraulic pressure supplied to the fourth clutch 69.

The various sensors 83 through 88 detect the hydraulic pressure supplied to various hydraulic actuators 44 through 49 via the aforedescribed hydraulic-pressure control valves 73 through 78 and send a detection signal to the control section 8. The detection signal corresponds to the magnitude of the detected hydraulic pressure. Specifically, the first hydraulic-pressure sensor 83 detects the hydraulic pressure supplied to the lift cylinder 44. The second hydraulic-pressure sensor 84 detects the hydraulic pressure supplied to the lift cylinder 45. The third hydraulic-pressure sensor 85 detects the hydraulic pressure supplied to the drawbar shift cylinder 46. The fourth hydraulic-pressure sensor 86 detects the hydraulic pressure supplied to the blade shift cylinder 47. The fifth hydraulic-pressure sensor 87 detects the hydraulic pressure supplied to the tilt cylinder 48. The sixth hydraulic-pressure sensor 88 detects the hydraulic pressure supplied to the hydraulic motor 49.

Control Section 8

The control section 8 controls the first through fifth cylinder control valves 73 through 77 and the hydraulic-motor control valve 78 on the basis of, e.g., command signals from the operation section 13 to the working equipment 4 and detection signals from the various sensors 83 through 88, whereby the position and orientation of the blade 42 can be changed. The control section 8 also controls the first through seventh clutch control valves 51 through 57 on the basis of, e.g., command signals from the accelerator 14, the gear-change lever, and the like, and detection signals from other hydraulic-pressure sensors (not shown), whereby gear changes can be controlled appropriately according to the state of the vehicle.

Among the gear-change control methods of the control section 8, a clutch-control method used during gear changes will be described in detail below.

Clutch-Control Method

Figure 4:
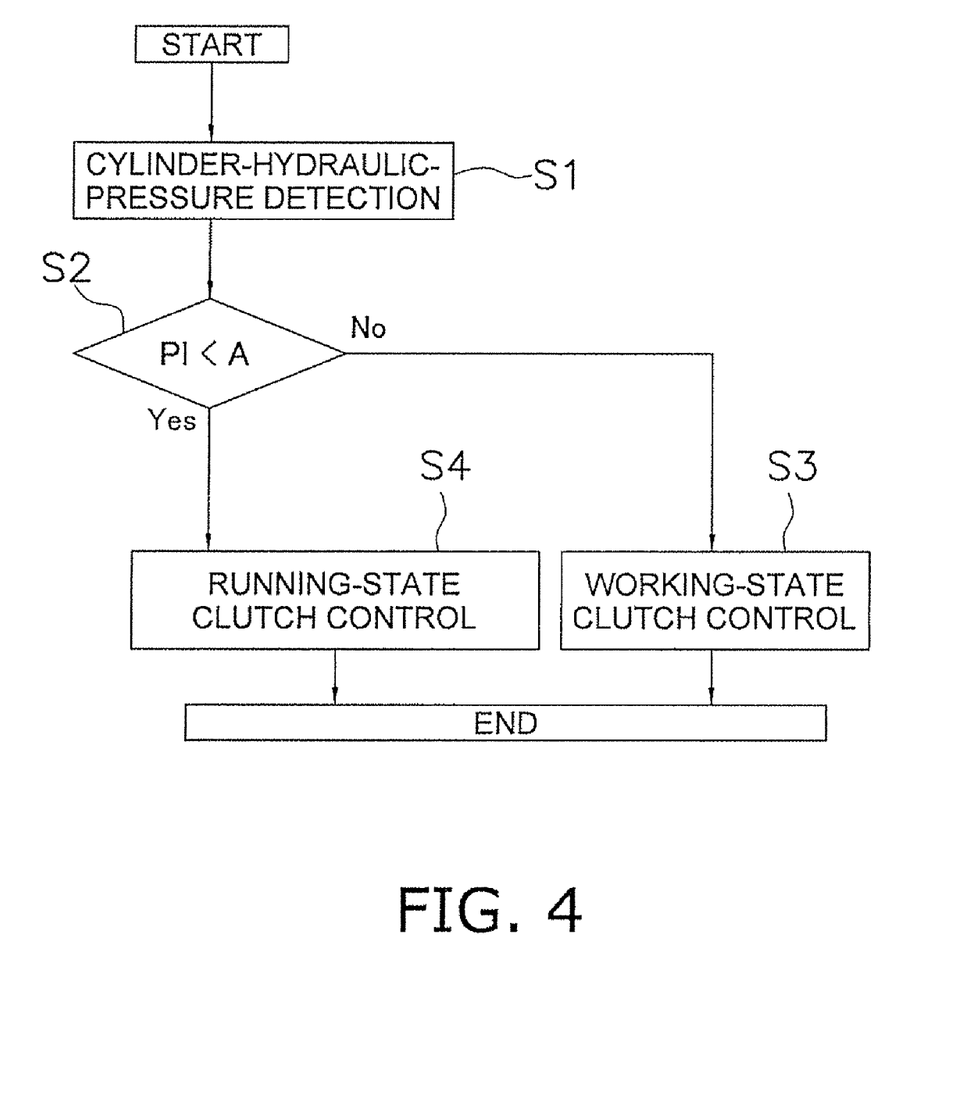
FIG. 4 is a flow chart that shows the clutch control.

A flowchart of clutch control in the control section 8 is shown in FIG. 4.

In a first step S1 (step for detecting cylinder hydraulic pressure), the hydraulic pressure supplied to the lift cylinders 44, 45 (referred to as "cylinder hydraulic pressure P1" below) is detected. The larger of the values for hydraulic pressure detected by the first hydraulic-pressure sensor 83 and the second hydraulic-pressure sensor 84 is referenced in the control section 8. The average value of the hydraulic pressure detected by the first hydraulic-pressure sensor 83 and the second hydraulic-pressure sensor 84 may be referenced in the control section 8.

In a second step S2 (determination step), a determination is made as to whether or not the cylinder hydraulic pressure P1 detected in the first step S1 is less than a predetermined threshold value A. Flow proceeds to a third step S3 when the cylinder hydraulic pressure P1 is not less than the predetermined threshold value A, i.e., when the cylinder hydraulic pressure P1 is greater than or equal to the predetermined threshold value A. Flow proceeds to a fourth step S4 when the cylinder hydraulic pressure P1 is less than the predetermined threshold value A.

Figure 5:
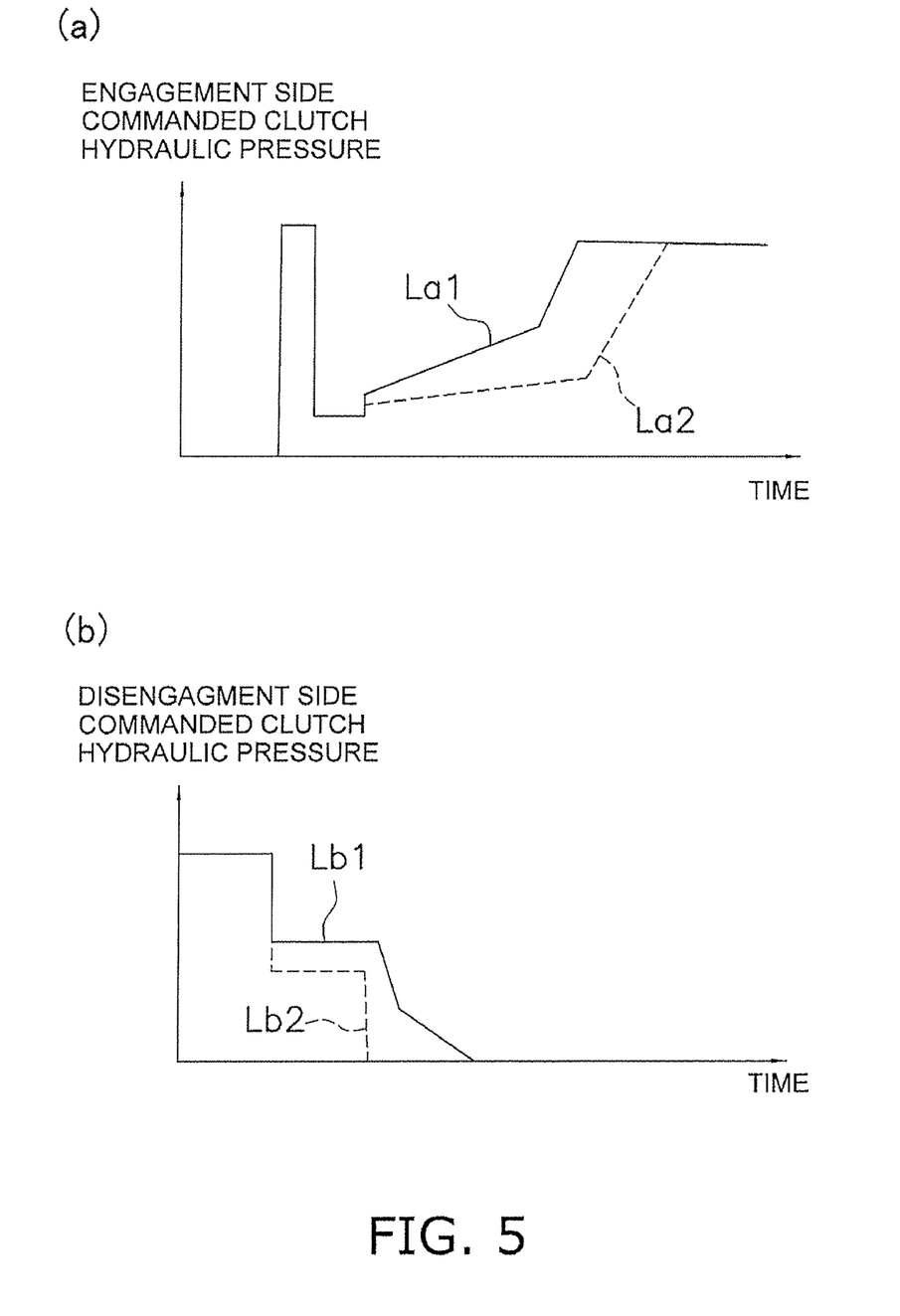
FIG. 5 includes timing charts (a) and (b) that show the hydraulic-pressure waveforms of the clutch control.

In the third step S3 (working-state clutch control step), the control section 8 judges that the vehicle is in a working state and controls the hydraulic pressure supplied to the first clutch 66 through the fourth clutch 69 using working-hydraulic-pressure waveforms corresponding to the working state. Time charts showing these working-hydraulic-pressure waveforms are shown as solid lines La1, Lb1 in FIGS. 5(a) and 5(b). The solid line La1 in FIG. 5(a) represents the engaged-clutch hydraulic pressure, i.e., the pressure of the gear-change clutch on the engagement side. The solid line Lb1 in FIG. 5(b) represents the disengaged-clutch hydraulic pressure, i.e., the pressure of the gear-change clutch on the disengagement side. These time charts show a case in which, among the first clutch 66 through the fourth clutch 69, the currently engaged gear-change clutch (e.g., the first clutch 66) is disengaged, and the gear-change clutch (e.g., the second clutch 67) corresponding to the selected gear is engaged, whereby a gear change is performed. Before the gear-change clutch on the disengagement side is released, the gear-change clutch on the engagement side is filled with hydraulic fluid. Once filling is completed, the gear-change clutch on the disengagement side is then released, after which the hydraulic pressure of the gear-change clutch on the engagement side is gradually increased. The occurrence of gear-change shocks is thereby suppressed.

In the fourth step S4 (running-state clutch control step), the control section 8 judges that the vehicle is in a running state and controls the hydraulic pressure supplied to the first clutch 66 through the fourth clutch 69 using running-hydraulic-pressure waveforms corresponding to the running state. These running-hydraulic-pressure waveforms are set to a lower hydraulic pressure than the working-hydraulic-pressure waveforms, as shown by the broken lines La2, Lb2 in FIGS. 5(a) and 5(b).

The working-hydraulic-pressure waveforms and running-hydraulic-pressure waveforms of the engagement-side gear-change clutch described above are prepared in advance and stored in the control section 8 according to gear-change conditions that are based on driving conditions, the transmission gears, and the like. Hydraulic-pressure waveforms are selected and employed according to the various gear-change conditions during gear-change control.

Characteristics

In this motor grader 1, the magnitude of the hydraulic pressure supplied to the lift cylinders 44, 45 is used to make a determination as to whether the vehicle is in a working state or a running state. The hydraulic-pressure waveforms for controlling the first clutch 66 through the fourth clutch 69 are switched between the working state and the running state.

Appropriate gear-change control can therefore be performed for the working state and the running state, respectively, and gear-change shocks can be suppressed upon switching the clutch.

Figure 6:
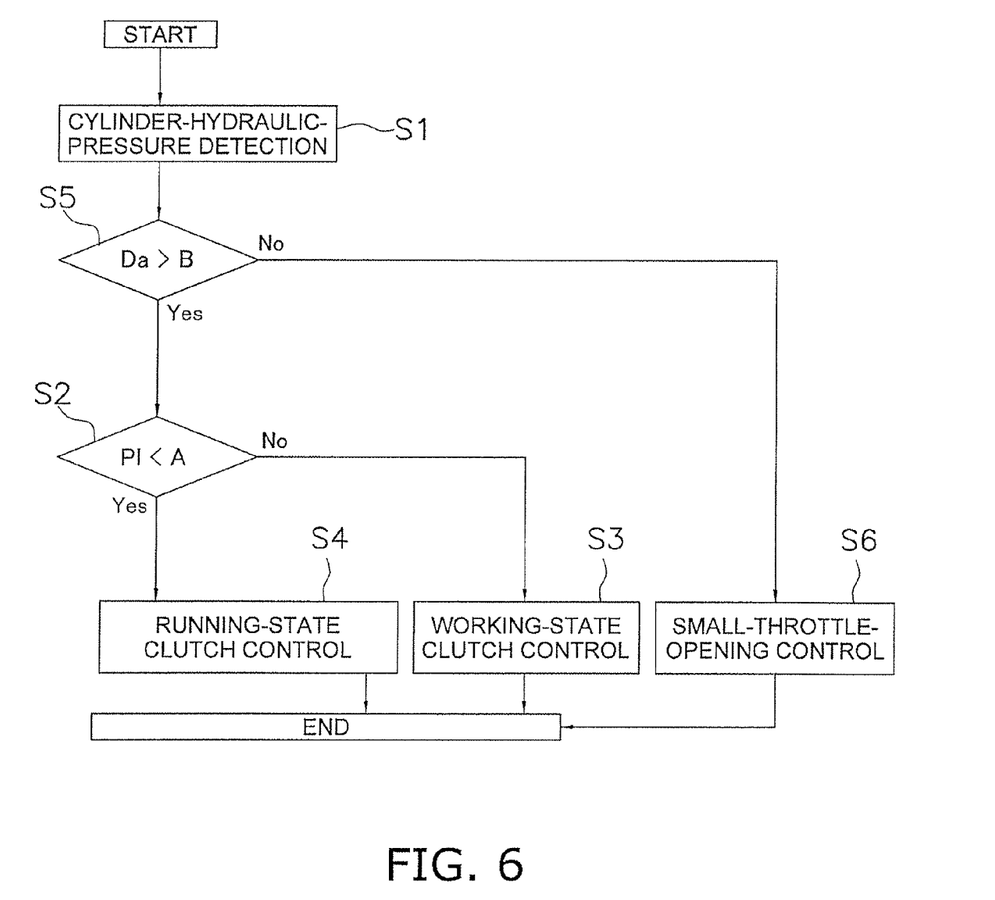
FIG. 6 is a flow chart that shows the clutch control according to another embodiment.

Other Embodiments (a) In addition to the aforedescribed clutch-control method, a determination may also be made as to whether or not a throttle opening Da is larger than a predetermined threshold value B, as shown in a fifth step S5 in FIG. 6. Flow proceeds to the second step S2 when the throttle opening Da is larger than the predetermined threshold value B. The second step S2 through the fourth step S4 are the same as in the aforedescribed embodiment. Flow proceeds to a sixth step S6 when the throttle opening Da is not larger than the predetermined threshold value B, i.e., when the throttle opening Da is less than or equal to the threshold value B. In the sixth step S6, a low-throttle hydraulic-pressure waveform corresponding to the case where the throttle opening Da is small is used to control the first clutch 66 through the fourth clutch 69. This low-throttle hydraulic-pressure waveform is different from both the waveforms for running hydraulic pressure and for working hydraulic pressure.

A judgment concerning the throttle opening Da is thus added, whereby appropriate gear-change control can be performed according to the state of the vehicle.

Figure 7:
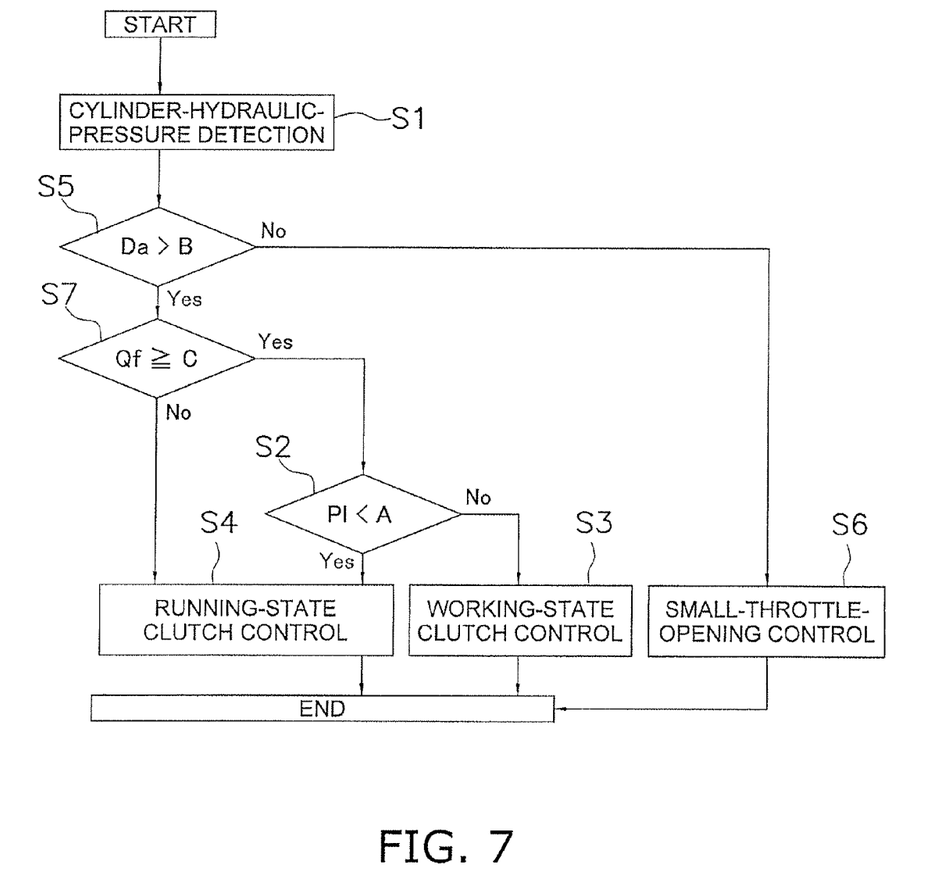
FIG. 7 is a flow chart that shows the clutch control according to another embodiment.

(b) In addition to the clutch-control method of the aforedescribed embodiment or the other embodiment (a), a judgment may also be made as to whether or not a fuel injection volume Qf is greater than or equal to a predetermined threshold value C, as shown in a seventh step S7 in FIG. 7. Flow proceeds to the second step S2 when the fuel injection volume Qf is greater than or equal to the predetermined threshold value C. The second step S2 through the sixth step S6 are the same as in the aforedescribed embodiments. Flow proceeds to the fourth step S4 when the fuel injection volume Qf is not greater than or equal to the predetermined threshold value C, i.e., when the fuel injection volume Qf is less than the threshold value C.

A judgment concerning the fuel injection volume Qf is thus added, whereby appropriate gear-change control can be performed according to the state of the vehicle.

The judgment may also be made on the basis of the magnitude of the engine torque instead of the fuel injection volume Qf.

(c) In the aforedescribed embodiments, the judgment of running state or working state was made on the basis of the hydraulic pressure supplied to the lift cylinders 44, 45, but the judgment may also be made on the basis of the hydraulic pressure supplied to the tilt cylinder 48. Additionally, the judgment may also be made on the basis of both the hydraulic pressure supplied to the lift cylinders 44, 45 and the hydraulic pressure supplied to the tilt cylinder 48.

The motor grader of the described embodiments can suppress shock when switching a clutch.

The invention claimed is:

1. A motor grader comprising:
   an engine;
   a wheel configured and arranged to be rotatably driven by a driving force from the engine;
   a driving force-transmitting mechanism configured and arranged to transmit the driving force from the engine to the wheel, the driving force-transmitting mechanism having a first clutch and a second clutch configured and arranged to be driven by hydraulic pressure;
   a working equipment cylinder configured and arranged to be driven by hydraulic pressure;
   a blade configured and arranged to be driven by the working equipment cylinder;
   a cylinder-hydraulic-pressure-detecting section configured and arranged to detect the hydraulic pressure supplied to the working equipment cylinder; and
   a control section configured to determine
      that the motor grader is in a running state when the cylinder hydraulic pressure detected by the cylinder-hydraulic-pressure-detecting section is less than a predetermined threshold value, and to use an engagement side running-hydraulic-pressure waveform corresponding to the running state to control the hydraulic pressure supplied to the first clutch and to use a disengagement side running-hydraulic-pressure waveform corresponding to the running state to control the hydraulic pressure supplied to the second clutch during a shift operation that requires the first clutch be engaged and the second clutch be disengaged in the running state, and
      that the motor grader is in a working state when the cylinder hydraulic pressure is greater than or equal to the threshold value, and to use an engagement side working-hydraulic-pressure waveform corresponding to the working state to control the hydraulic pressure supplied to the first clutch and to use an disengagement side working-hydraulic-pressure waveform corresponding to the working state to control the hydraulic pressure supplied to the second clutch during a shift operation that requires the first clutch be engaged and the second clutch be disengaged in the working state.

2. The motor grader according to claim 1, wherein the working equipment cylinder is a lift cylinder configured and arranged to move the blade in a vertical direction.

3. The motor grader according to claim 1, wherein the working equipment cylinder is a tilt cylinder configured and arranged to change an angle of the blade.

4. A method for controlling first and second hydraulic clutches provided to a motor grader, the method comprising:
   detecting a cylinder hydraulic pressure supplied to a working equipment cylinder for driving a blade;
   determining whether or not the cylinder hydraulic pressure detected is less than a predetermined threshold value;
   determining that the motor grader is in a running state when the cylinder hydraulic pressure is less than the threshold value, controlling hydraulic pressure supplied to the first hydraulic clutch using an engagement side running-hydraulic-pressure waveform corresponding to the running state, and controlling hydraulic pressure supplied to the second hydraulic clutch using a disengagement side running-hydraulic-pressure waveform corresponding to the running during a shift operation that requires the first hydraulic clutch be engaged and the second hydraulic clutch be disengaged in the running state; and
   determining that the motor grader is in a working state when the cylinder hydraulic pressure is greater than or equal to the predetermined threshold value, controlling the hydraulic pressure supplied to the first hydraulic clutch using an engagement side working-hydraulic-pressure waveform corresponding to the working state, and controlling the hydraulic pressure supplied to the second hydraulic clutch using a disengagement side working-hydraulic-pressure waveform corresponding to the working state during a shift operation that requires the first hydraulic clutch be engaged and the second hydraulic clutch be disengaged in the working state.

5. The motor grader according to claim 1, wherein
the control section is further configured to determine whether or not a throttle opening of the engine is larger than a predetermined throttle opening threshold value, and to use a low-throttle-hydraulic-pressure waveform to control the hydraulic pressure supplied to at least one of the first clutch and the second clutch when the throttle opening is smaller than the predetermined throttle opening threshold value, with the low-throttle-hydraulic-pressure waveform being different from the engagement side running-hydraulic-pressure waveform, the disengagement side running-hydraulic-pressure waveform, the engagement side working-hydraulic-pressure waveform and the disengagement side working-hydraulic-pressure waveform.

* * * * *